(12) United States Patent
Kunimatsu et al.

(10) Patent No.: US 6,366,276 B1
(45) Date of Patent: Apr. 2, 2002

(54) TOUCH OPERATION SIGNAL OUTPUT DEVICE

(75) Inventors: Yoshimasa Kunimatsu; Minoru Morikawa; Shigeru Hayashi; Sadao Kokubu, all of Niwa (JP)

(73) Assignee: Kabushiki Kaisha Tokai-Rika-Denki-Seisakusho, Aichi-ken (JP)

( * ) Notice: Subject to any disclaimer, the term of this patent is extended or adjusted under 35 U.S.C. 154(b) by 0 days.

(21) Appl. No.: 09/095,107

(22) Filed: Jun. 10, 1998

(30) Foreign Application Priority Data

Jun. 13, 1997 (JP) .............................. 9-156544

(51) Int. Cl.[7] .................................. G09G 5/00
(52) U.S. Cl. ..................... 345/175; 345/173; 345/207
(58) Field of Search .................. 345/175, 173, 345/207; 250/221; 340/556

(56) References Cited

U.S. PATENT DOCUMENTS

| | | | | |
|---|---|---|---|---|
| 4,751,379 A | * | 6/1988 | Sasaki et al. ............. | 345/175 |
| 4,774,404 A | | 9/1988 | Hasegawa et al. | |
| 4,777,482 A | * | 10/1988 | Kaneko et al. ............ | 345/175 |
| 4,868,550 A | * | 9/1989 | Sasaki et al. ............. | 345/175 |
| 4,868,912 A | | 9/1989 | Doering | |
| 4,905,174 A | | 2/1990 | Ouchi | |
| 5,136,156 A | * | 8/1992 | Nounen et al. ............ | 250/221 |
| 5,414,413 A | * | 5/1995 | Tamaru et al. ............ | 345/175 |
| 5,515,083 A | * | 5/1996 | Casebolt et al. ........... | 250/221 |
| 5,808,606 A | * | 9/1998 | Kodama et al. ........... | 345/175 |

FOREIGN PATENT DOCUMENTS

| | | |
|---|---|---|
| EP | 0 332 410 A2 | 9/1989 |
| EP | 0 366 913 A2 | 5/1990 |
| EP | 0 572 009 A1 | 12/1993 |
| EP | 0 668 569 A2 | 8/1995 |
| GB | 2 211 606 A | 7/1989 |
| JP | 8-272537 | 10/1996 |
| WO | WO 86/03315 | 6/1986 |

* cited by examiner

Primary Examiner—Chanh Nguyen
Assistant Examiner—Fritz Alphonse
(74) Attorney, Agent, or Firm—Oliff & Berridge, PLC

(57) ABSTRACT

A method and apparatus are provided for reliably detecting a touch operation in a touch sensitive control surface, despite the influence of light or the existence of an obstruction. In the touch tracer, LEDs and phototransistors for detecting a touch position on the input pad are arranged to form parallel optical axes in the vertical direction and the horizontal direction. The optical axes of the LEDs and the phototransistors are alternately arranged in opposite directions to the adjacent optical axis. Moreover, the front surface of the phototransistor is closed except for an aperture that forms an optical axis only between opposing LEDs. The apertures are divided in half into top and bottom portions by a light-shielding film. Because of the light-shielding film, the phototransistor does not receive any light interference from the adjacent LED or incidental sunlight.

12 Claims, 16 Drawing Sheets

(b) Xxo  ; 0 0 0 0 0 1 1 0 0 0 1 0 0 0 0

(c) Xmask; 0 0 0 0 0 1 1 1 1 1 1 0 0 0 0

(d) Xmove; 0 0 0 0 0 0 0 1 1 1 1 0 0 0 0

(e) Xfix ; 1 1 0 0 0 0 0 0 0 0 0 0 0 0 0

FIG. 20

| | | LIGHT SHIELDED OPTICAL AXIS OF X-LINE | |
|---|---|---|---|
| | | SHIFT | NO SHIFT |
| LIGHT SHIELDED OPTICAL AXIS OF Y-LINE | SHIFT | X : Xmove<br>Y : Ymove | X : Xn<br>Y : Ymove |
| | NO SHIFT | X : Xmove<br>Y : Yn | |

TOUCH OPERATION SIGNAL OUTPUT DEVICE

INCORPORATION BY REFERENCE

The disclosure of Japanese Patent Application No. Hei 9-156544 filed on Jun. 13, 1997 including the specification, drawings and abstract is incorporated herein by reference in its entirety.

BACKGROUND OF THE INVENTION

1. Field of Invention

The present invention relates to a touch operation information output device which outputs touch operation information by optically detecting a touch range with respect to an operating surface.

2. Description of Related Art

Conventionally, vehicles, for example, are provided with a display device with a touch operation function. One example of this kind of display device is structured to detect a finger touching a position with respect to a display screen through an optical sensor.

Specifically, light projection elements and light-receiving elements are arranged so as to form a plurality of parallel optical axes corresponding to a vertical direction and a horizontal direction of the display screen. Based on the fact that the optical axes which go through a projection element to a light-receiving element are cut by a finger touching the display screen, the display device is structured to detect the center position of the touched area and to output the coordinate data thereof.

Accordingly, for example, when a screen for an air conditioner is displayed, the air conditioning in the vehicle can be arbitrarily adjusted by touch-operating the button display part which is displayed a screen. By using this kind of display device with a touch operation function, the manual vehicle switches, such as for the air conditioner, audio and car navigation system, etc., can be omitted. Therefore, the instrument panel can look neat.

However, when the above-mentioned display device with the optical type touch operation function is provided, there are cases when bright sunlight is incident upon the display device. In this case, even though the light-receiving element is shielded by a finger, there is a tendency for the detection of the touch operation to become unreliable because the sunlight causes the light-receiving element to be in a light-receiving condition.

Moreover, when dust collects on the display screen, the optical axis may be shielded by the dust. In this case, the detection of the touch operation with respect to the display screen becomes unreliable.

SUMMARY OF THE INVENTION

The invention provides a touch operation information output device which can detect a touch operation on a operating surface, despite the influence of light or the existence of obstructions, and output reliable touch operation information.

The invention includes a plurality of light projection elements and light-receiving elements to form a vertical direction optical axis group and a horizontal direction optical axis group that are composed of a plurality of parallel optical axes in the vertical direction and the horizontal direction on the operating surface, and outputs touch operation information to the operation surface based on a light-shielding condition of each of the optical axis groups. A light-shielding member is provided to shield the front surface of the light-receiving elements from the light, and has an aperture to form an optical axis only between light projection elements that are opposed to the light-receiving element. A matte (or non-reflective) light-shielding slit member is provided along the operating surface in the aforementioned aperture of this light-shielding member, and divides the inside of the aperture.

In this structure, when the operating surface is touched, the optical axis corresponding to the portion which is touched by the operating surface becomes light-shielded. The corresponding touch position on the operating surface can be confirmed by an external machine that outputs the desired data.

Since the light-shielding member is provided in front of the light-receiving elements for forming the optical axes, and since the apertures for forming the optical axes are provided only between the light projection elements that are opposed to the light-shielding member, the influence by the interference light which is incident from the adjacent optical axis to the light-receiving element, can be prevented.

Moreover, even if sunlight is incident to the apertures of the light-shielding member, inside the aperture, a light-shielding slit member which divides the inside of the aperture along the operating surface, is provided. The sunlight which is incident to the aperture is absorbed by the slit member, thus any sunlight which may be incident to the aperture parts and reflected in the aperture, can be prevented from reaching the light-receiving elements.

In the above-mentioned structure, it is also appropriate to form a concave part along the optical axis in the inside bottom surface of the apertures of the light-shielding member. According to this kind of the structure, even when incidental sunlight reaches the inside bottom surface of the apertures, since the concave part is formed along the optical axis in the inside bottom surface, and since sunlight is absorbed at the light-shielding slit member, incidental sunlight can be prevented from affecting the light-receiving elements.

The invention arranges a plurality of light projection elements and light-receiving elements to form a vertical direction optical axis group and a horizontal direction optical axis group that are composed of a plurality of parallel optical axes in a vertical direction and a horizontal direction on an operating surface. The touch operation information output device is provided with an output device that outputs touch information to the operating surface when it is determined, based on a light shaded condition of each optical axis, that a touch operation has occurred. The light projection elements and light-receiving elements that form the optical axis groups are alternately arranged the direction of an optical axis from one of the light projection elements to one of the light-receiving elements is different than the direction of an adjacent optical axis. In addition, when an optical axis is alternately in the light-receiving condition in the optical axis group, the optical axis is considered to be a light-shielded optical axis.

According to this kind of structure, since the projection element is arranged right next to the light-receiving element, the light-receiving element receives the light from the adjacent projection element, and any occurring interference can be prevented.

In this case, a plurality of the light-receiving elements that are arranged on one side, become the light-receiving because of the influence of sunlight, even through the light-receiving elements should be in the non-light-receiving condition due to a touch operation on the operating face. However, since a plurality of the light-receiving elements that on the other side are in the non-light-receiving condition due to the touch operation on the operating surface, when a intermittent light-shielded optical axis group exists in the optical axis group in which the optical axis is alternately in the light-receiving and non-light-receiving conditions, the optical axis is considered as a light-shielded optical axis, so that the output device reliable detects the touch position of the operating surface and outputs without being influenced by the sunlight.

The invention arranges a plurality of light projection elements and light-receiving elements to form a vertical direction optical axis group and a horizontal direction optical axis group that are composed of a plurality of parallel optical axes in a vertical direction and a horizontal direction on an operating surface. The touch operation information output device is provided with an output device that outputs touch operation information to the operating surface when it is determined, based on a light shaded condition of each optical axis, that a touch operation has occurred. The output device determines whether a touch operation has been performed when a plurality of light-shielded optical axes exist in the optical group, when these light-shielded optical axes continue to be light-shielded, and the number of these light-shielded optical axes is a predetermined number. The output device may also determine whether a touch operation is performed when these light-shielded optical axes shift, the number of the optical axes that are included in a maximum width from a first light-shielded optical axis to a last light-shielded optical axis is a predetermined number, and when a number of light-entering optical axes that are included in the maximum width is a predetermined number.

According to this kind of structure, when a plurality of optical axes continue to be shielded by a finger touching the operating surface, and the number of these light-shielded optical axes becomes a predetermined number corresponding to the size of a finger, the output device evaluates that the operating surface is touch-operated, and can output the touch position with respect to the operating surface by outputting the coordinate data which shows the center position of the light-shielding optical axis group.

In addition, when light-receiving elements which originally should be in a non-light-receiving element condition due to the finger touch operation, are in a light-receiving condition due to the incidental influence of light, or the like, a touch operation on the operating face may not be detected. However, when the light-shielded optical axis exists by shifting the light-entering optical axis, the number of optical axes which are included in the maximum width from the first light-shielded optical axis to the last light-shielded optical axis is a predetermined number, and when the number of light-entering optical axes which are included in that maximum width is less than the predetermined number, the output device evaluates that it is a touch operation on the operating surface, and outputs the coordinate data which shows the center position of the maximum width. By doing this, the coordinate data which shows the center position of the touch operation can be output without being influenced by the incidental light, or the like.

In the invention, when the output device evaluates that the touch operation has not been performed even though a plurality of light-shielded optical axis exist in the optical axes group, the evaluation of the touch operation is re-executed with the condition of removing the light-shielding optical axis that has not shifted, from the previous detection time.

According to this kind of structure, when a touch operation is performed when the light-shielding optical axis exists because dust, or the like, existing on the operating surface, the maximum width which is from the light-shielding optical axis to the last light-shielding optical axis becomes larger than the width corresponding to a finger, therefore, even through the touch-operation is performed, the output device may determine that the touch operation has not been performed. However, when the output device determines that the touch-operation has not been performed when a plurality of light-shielding optical axis exist in the optical group, since the evaluation of the touch operation is re-executed after removing the light-shielding optical axis which has not shifted from the previous detection time, the touch-operation position is reliably detected by invalidating the existence of the light-shielded optical axis obstructed by dust, or the like.

BRIEF DESCRIPTION OF THE DRAWINGS

FIG. 19 is a diagram showing a specific operation of the extraction processing of the shifted light-shielding optical axis by a bit pattern; and FIG. 20 is a diagram which shows the corresponding relationship of the x and y axes of the light-shielding optical axes.

DETAILED DESCRIPTION OF PREFERRED EMBODIMENTS

Hereafter, an embodiment of the present invention as adapted to the display system of a vehicle, is explained with reference to the drawings.

Figure 1:
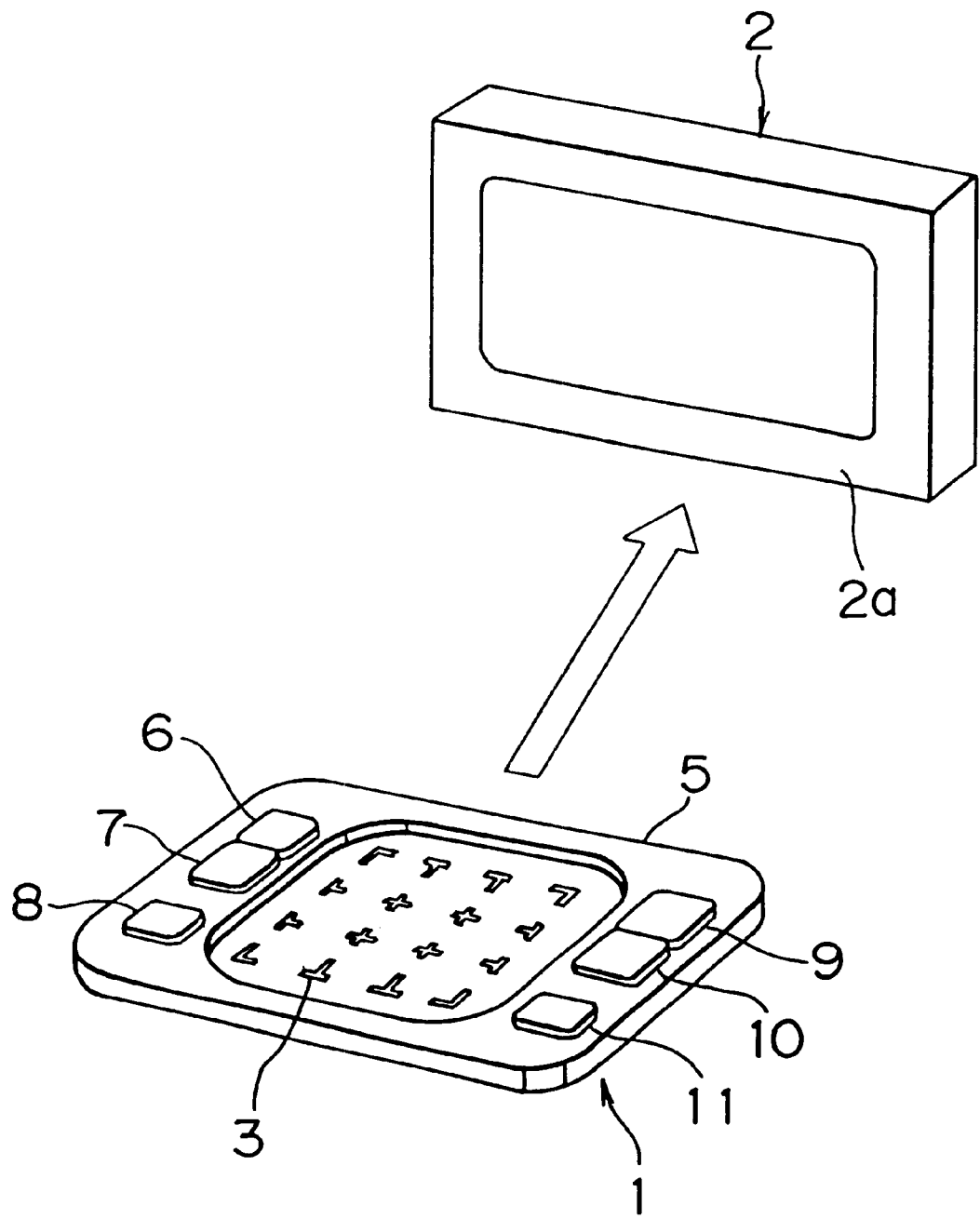
FIG. 1 is an oblique view showing the system components of an embodiment of the invention.

In the system of FIG. 1, the touch tracer (touch operation information output device) 1 may be provided, for example, in the armrest portion of the driver side door, where the driver can easily operate it while driving the vehicle, and can output touch operation information corresponding to a touch operation. Moreover, the display device 2 may be arranged on the dashboard of the vehicle, and predetermined screens can be displayed corresponding to the touch operation information from the touch tracer 1, for example.

Figure 2:
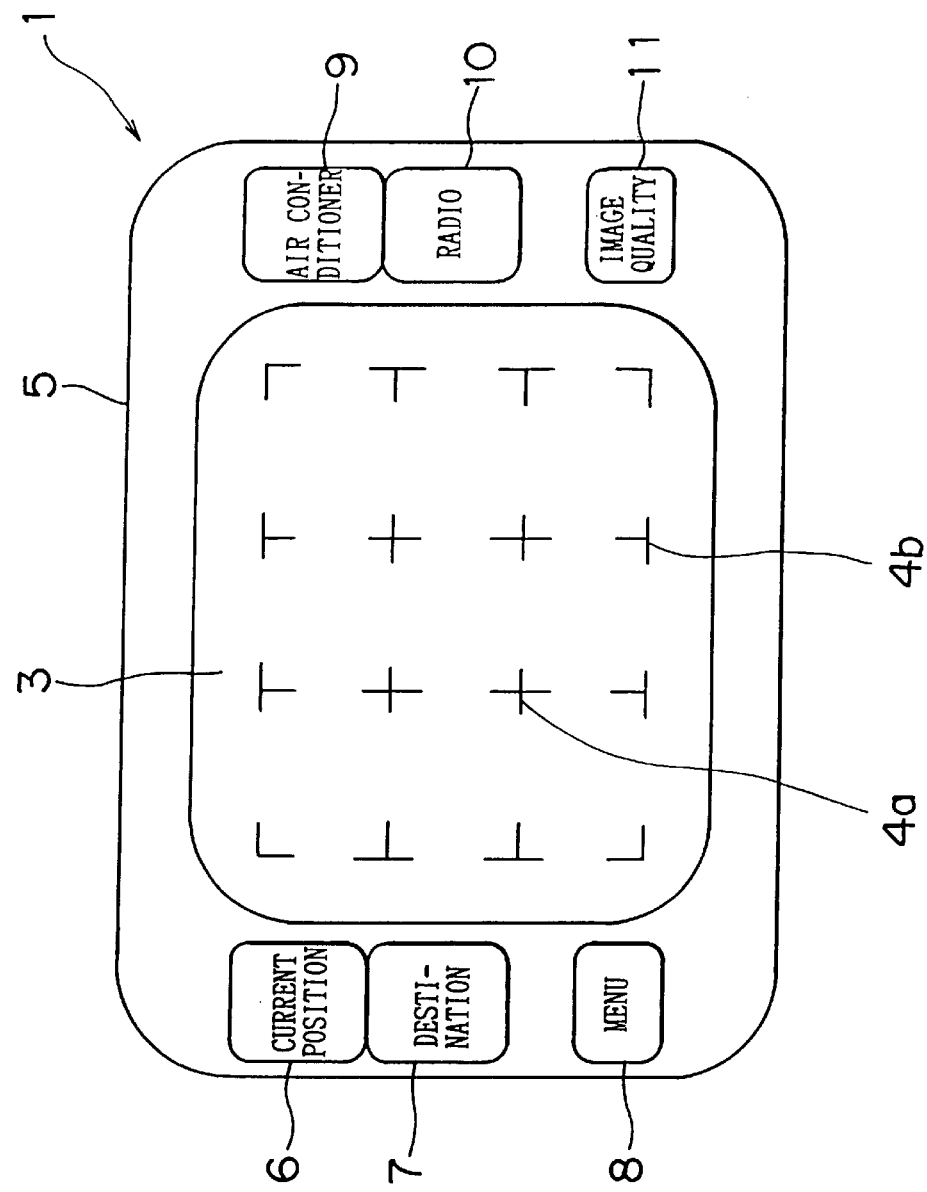
FIG. 2 is a front view of a touch tracer.

A detailed description of the touch tracer 1 is given with reference to FIG. 2. FIG. 2 shows the front view of the touch tracer 1. An input pad 3 (50×70 mm) is arranged in the center of the touch tracer 1. In predetermined positions of the surface of the input pad 3, line shaped protruding brackets 4a and 4b are formed at the predetermined positions of the surface of the input pad 3. 16 positions of these protruding brackets 4a and 4b are provided on the input pad 3. 4 positions of the protruding brackets 4a that are in the center are formed in a"+" shape, and the other brackets 4b are formed in a "T" shape or "L" shape. Accordingly, since the touched position can be confirmed by just touching the protruding brackets 4a and 4b of the input pad 3, blind operation is possible.

Moreover, the positions of the protruding brackets 4a and 4b correspond to the position of a button display portion which is displayed on the display device 2. This, arbitrary buttons can be turned on by blind operation.

At the periphery of the input pad 3 in the top surface of the main body 5, various kinds of the mode selection buttons are arranged. For these selection buttons, a current position button 7, a destination button 6, a menu button 8, an air conditioner button 9, an audio button 10 and an image quality button 11 are provided.

Figure 3:
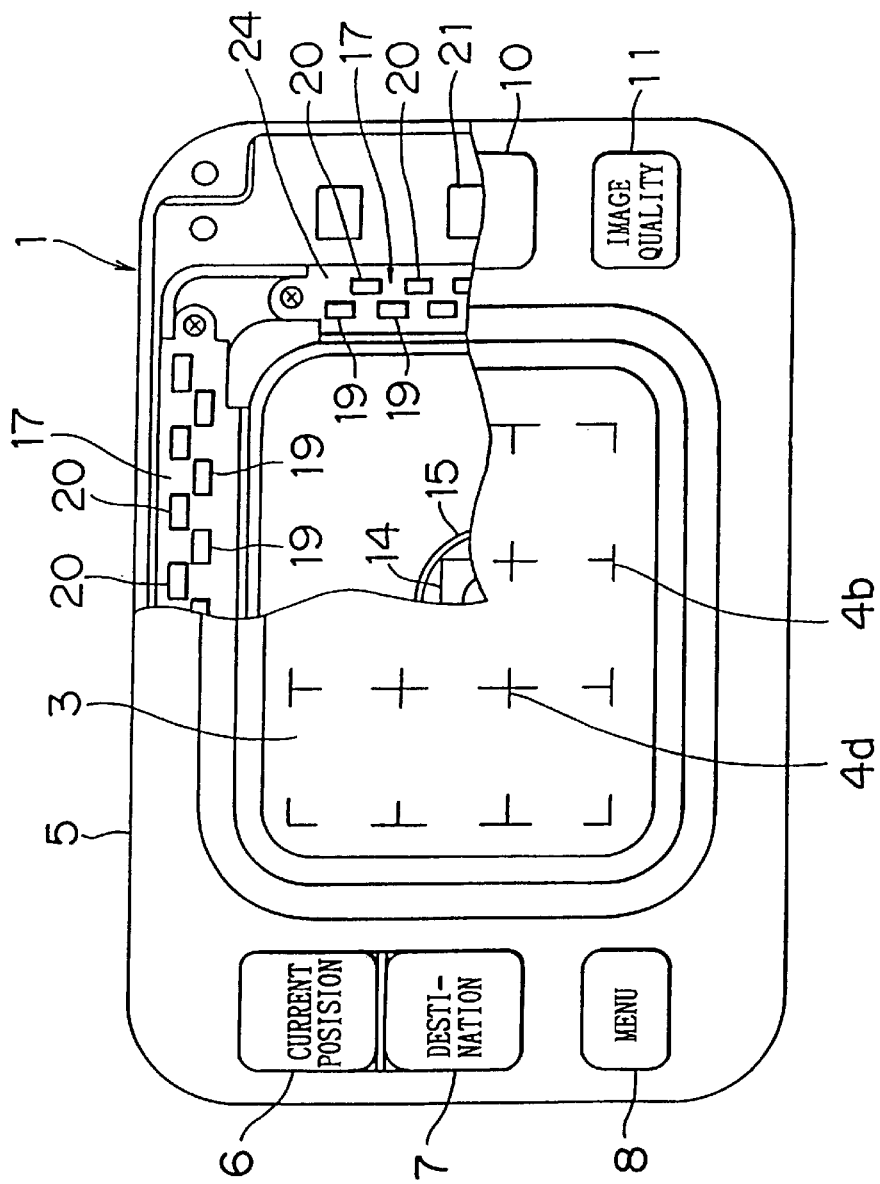
FIG. 3 is a front view which shows the cut-away of the touch tracer.
Figure 4:
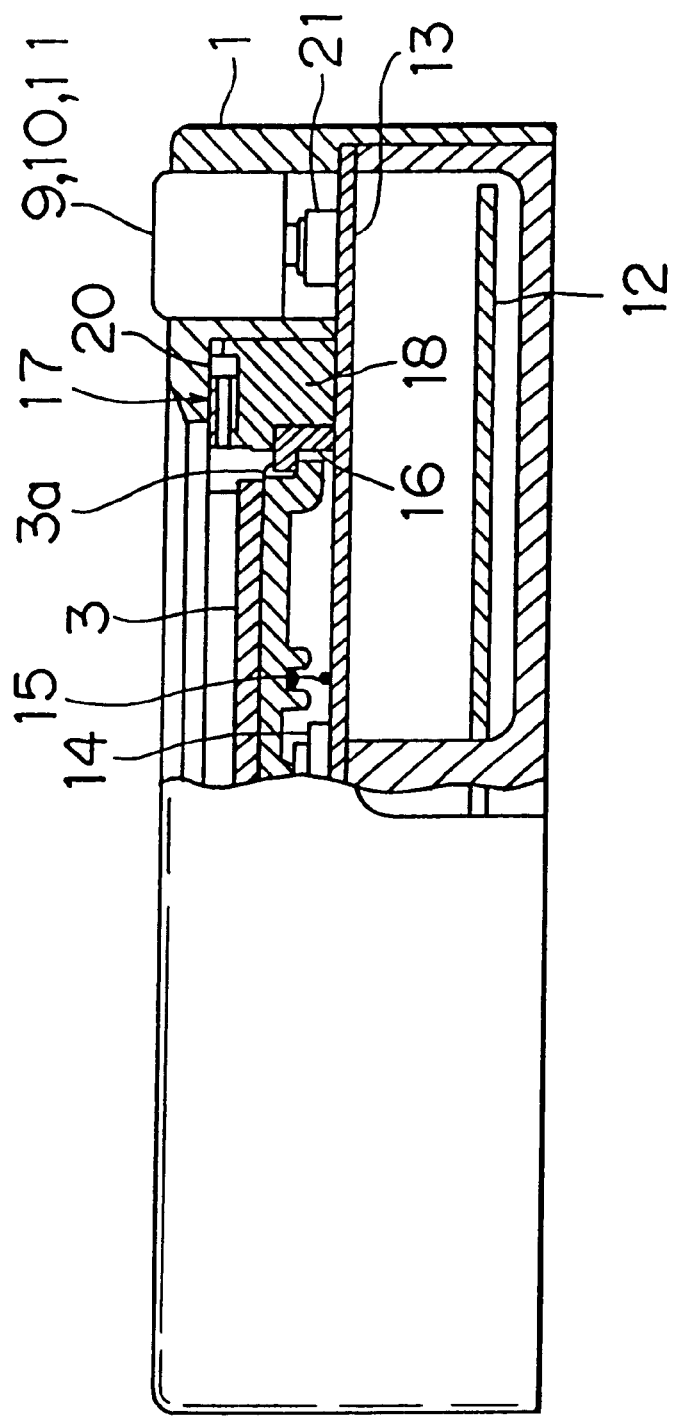
FIG. 4 is a cross-sectional view of the touch tracer.

FIG. 3 is a front view which shows a partial cut-out of the touch tracer 1. FIG. 4 shows the cross-sectional view. In FIGS. 3 and 4, a printed wiring substrate 12 is arranged at the bottom surface of the main body 5, and a printed wiring substrate 13 is arranged on the top surface. A touch switch 14 is installed at the center of the printed wiring substrate 13, and a compression coil spring 15 is arranged to surround the aforementioned touch switch 14. The input pad 3 is elastically supported from below by the compression coil spring 15.

A frame-shaped engaging member 16 is provided on the printed wiring substrate 13, and the outer periphery of the input pad 3 is engagingly stopped on the bottom surface of its engaging member 16. Moreover, a pleat shaped packing part 3a protrudes on the peripheral part of the input pad 3, and waterproofs the inside of the main body 5 by contacting the top surface of the engaging member 15.

The optical sensor unit 17 is installed on the printed wiring substrate 13 and comprises a plurality of LEDs 19 (light projection elements) and phototransistors 20 (light-receiving elements) that are arranged on the sensor block 18 (light-shielding member) so that parallel optical axes are formed. The LEDs 19 and the phototransistors 20 are connected to the electrical circuit of the printed wiring substrate 13. In the peripheral part of the printed wiring substrate 13, a plurality of operation switches 21 are installed that turn on and off in response to the touch operation of the operation buttons 6–11.

Figure 5:
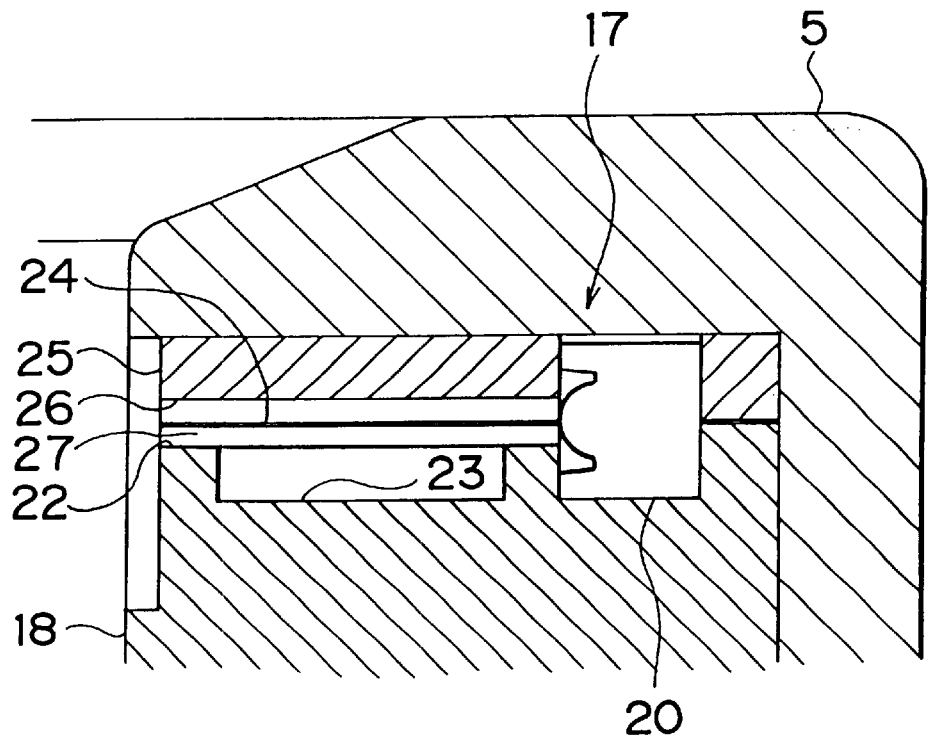
FIG. 5 is a cross-sectional view of an optical sensor unit.
Figure 6:
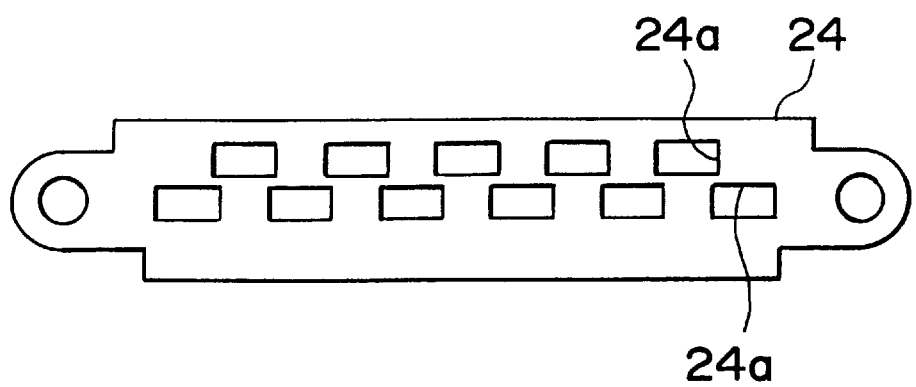
FIG. 6 is a plan view of a light-shielding film.

FIG. 5 shows the details of the light-receiving part, and particularly the phototransistor 20 as part of the optical sensor unit 17. In short, in the sensor block 18, in the front side of the phototransistor 20, the groove part 22 is formed along the optical axis of the aforementioned photo transistor 20, and the concave part 23 is formed along the optical axis in the intermediate part of the groove part 22. Moreover, on the sensor block 18, a fixed block 25 (light-shielding member) is fixed via the light-shielding film 24 (light-shielding slit member) that is made by the polyester film (a matte or non-reflective black color coating having a thickness of 0.05 mm) as shown in FIG. 6. Rectangular-shaped cutout parts 24a are formed at predetermined positions of the light-shielding film 24, and the LEDs 19 and the phototransistors 20 that are arranged on the sensor block 18 so that they are inserted into the cutout parts 24a.

Figure 7:
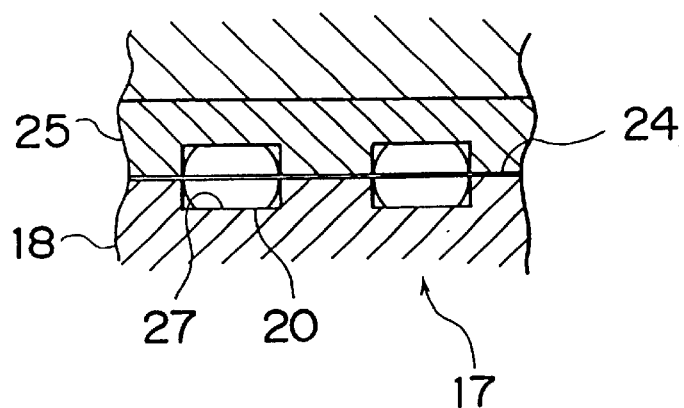
FIG. 7 is a front view of the aperture of the optical sensor unit.

Moreover, the groove part 26 is formed along the optical axis in the fixing block 25. The fixing block 25 is fixed on the sensor block 18, and an aperture 27 which is formed by the groove parts 22 and 26, is formed along the optical axis at the front surface of the phototransistor 20. The light-shielding film 24 serves to divide the aperture 27 in half in the vertical direction (refer to FIG. 7).

Figure 8:
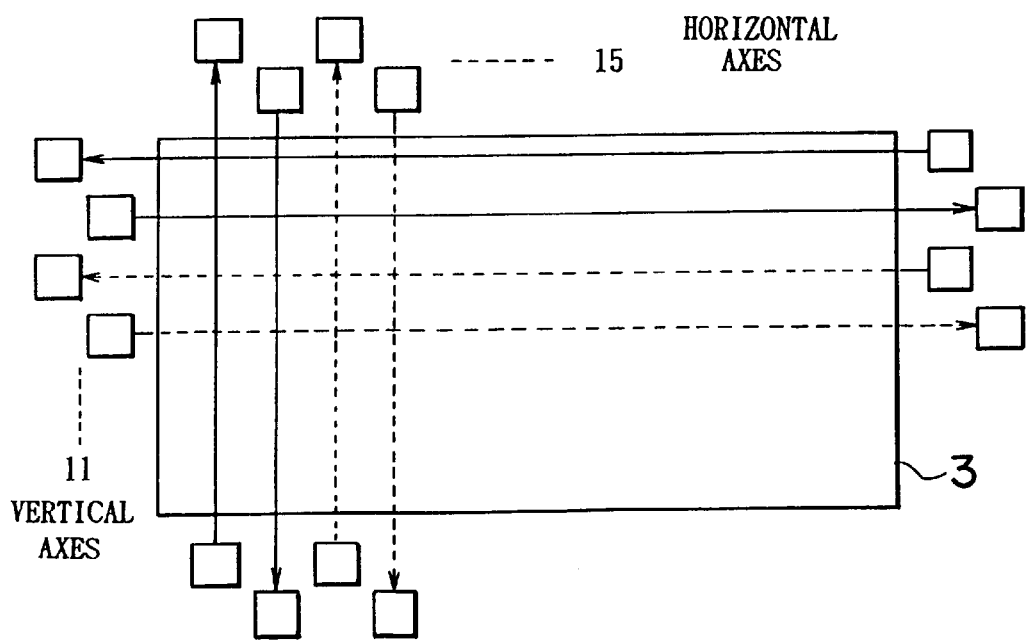
FIG. 8 is a diagram showing the arrangement relationship of LED's and a phototransistors.

FIG. 8 shows the arrangement of the LEDs 19 and the phototransistors 20. In FIG. 8, 15 axes are provided as horizontal direction optical axes (hereafter, X lines), and 11 axes are provided as vertical direction optical axes (hereafter, Y lines). In this case, the LEDs 19 and the phototransistors 20 are alternately parallel arranged in each of the X lines and the Y lines. Moreover, in the parallel arranged LEDs 19 and phototransistors 20, the phototransistors 20 are arranged in back of the LEDs 19. Because of this arrangement, the optical axis pitch of the X lines is 3 mm, and the optical axis pitch of the Y lines is 4 mm.

Figure 9:
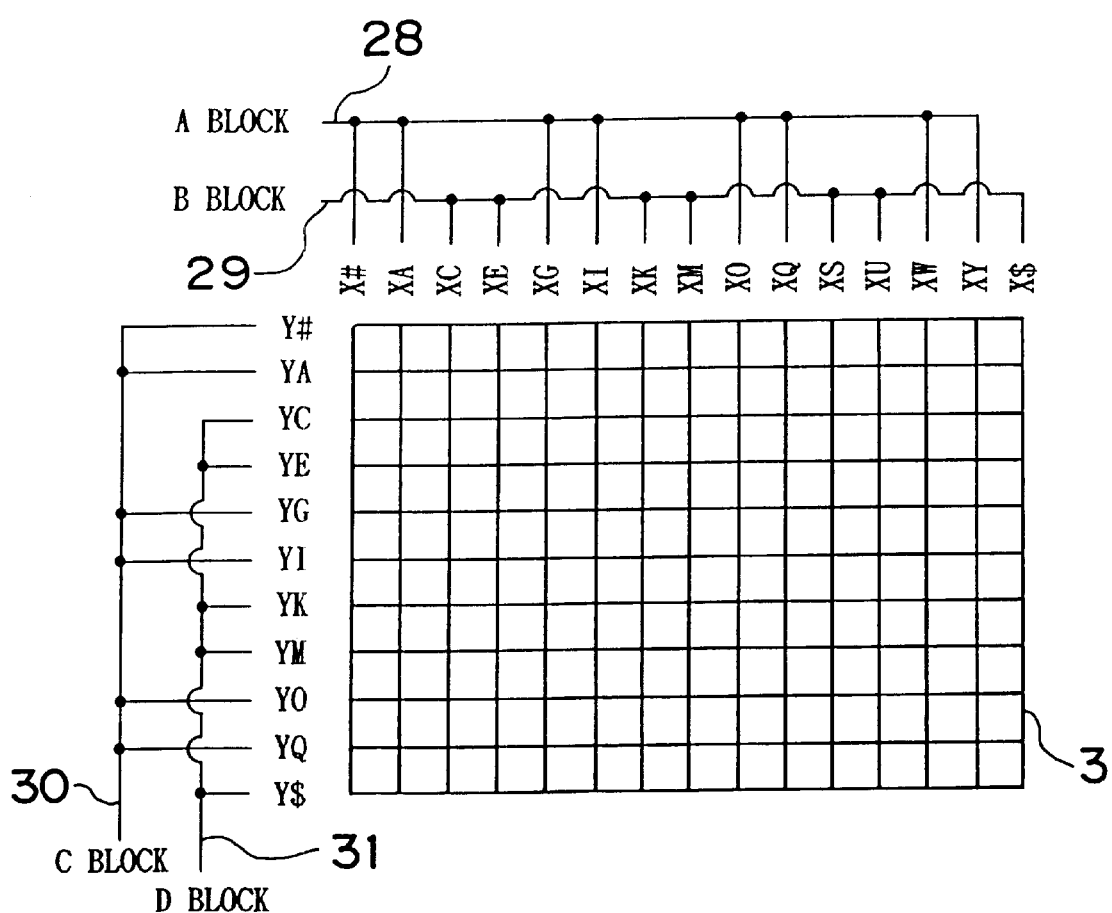
FIG. 9 is a diagram of a blocked optical group.

Meanwhile, as shown in FIG. 9, the LED 19 and the phototransistors 20 that form the X lines are divided into A blocks and B blocks. The A block control line 28 and the B block control line 29 are connected to the LEDs 19 and the phototransistors 20 that form each block. Moreover, the LEDs 19 and the phototransistors 20 that form the Y lines are divided into C blocks and D blocks. The C block control line 30 and the D block control line 31 are connected to the LEDs 19 and the phototransistors 20 that form each block.

In this case, the LEDs 19 and the phototransistors 20 that form the X lines are indicated as X#, XA, . . . , XY, X$, and the LEDs 19 and the phototransistors 20 that form the Y lines are indicated as Y#, YA, . . . , YQ, Y$. By making any of the predetermined block control lines 28–31 active, the corresponding LEDs 19 and phototransistors 20 that form the block are operated.

Figure 10:
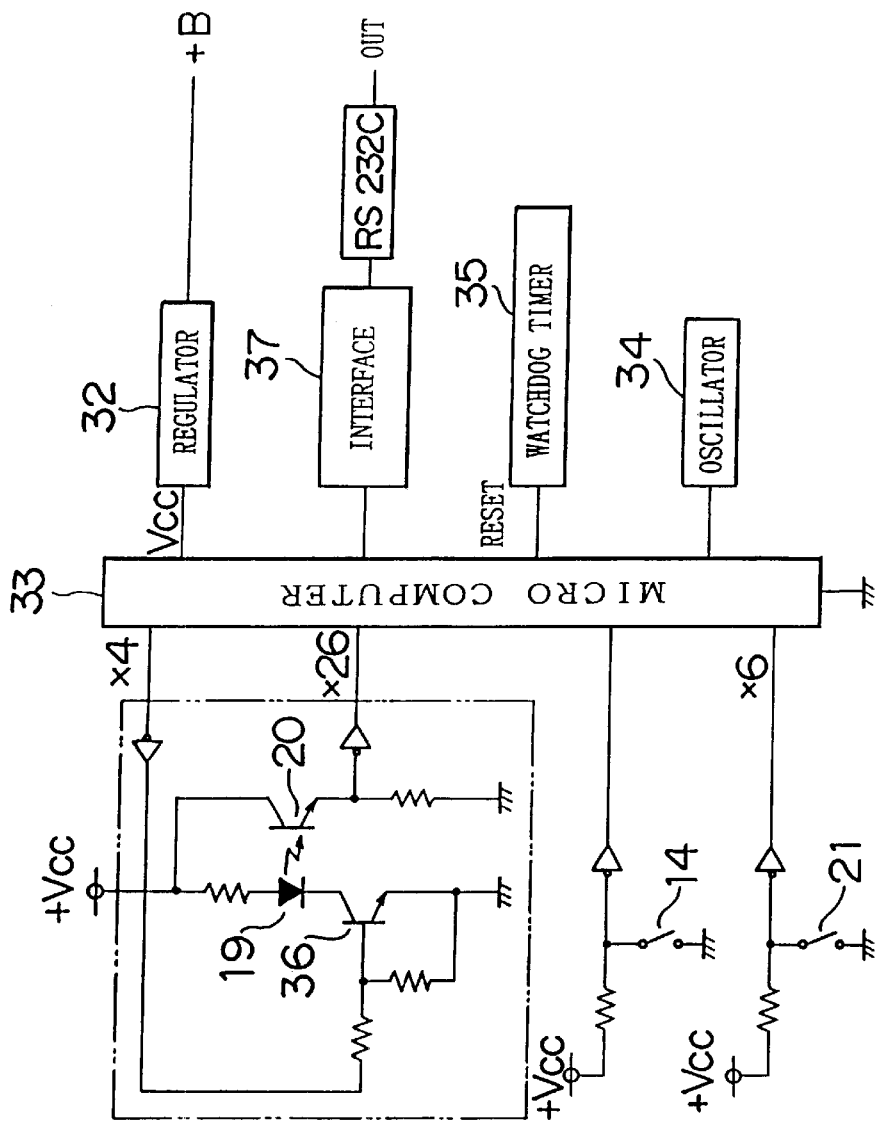
FIG. 10 is a diagram of electrical components of the touch tracer.

FIG. 10 shows the electrical structure of the touch tracer 1. The voltage of the battery (+B) is fed to the microcomputer 33 (or output device) by the regulator 32 in a stabilized condition as a predetermined constant voltage. The microcomputer 33 is operated in accordance with a pulse signal from the oscillator 34. Moreover, a watchdog timer 35 is connected to the reset terminal of the microcomputer 33, and when the microcomputer malfunctions, it is forcibly reset by the watchdog timer 35. Then, the microcomputer 33 is connected to receive the on-off signals from the touch switch 14 and each operation switch 21.

Each LED 19 is connected to a transistor 36. When the microcomputer 33 supplies current to the transistor 36, the transistor 36 is turned on, current passes to the LED 19 and the LED 19 emits light. Moreover, the microcomputer 33 receives the output voltage from each phototransistor 20. In this case, the microcomputer 33 first lights up the A block and the B block the LEDs 19 that are shown in FIG. 9, then lights the C blocks and the D block LED 19 of the Y line. The microcomputer 33 receives the output voltage from the phototransistors 20 of the lighted blocks.

Then, the microcomputer 33, based on the switches 14 and 21 and the on-off condition of the phototransistors 20, as described below, outputs the on-off data of the switches 14, 21 and the coordinate data which shows the finger-touched position with respect to the input pad 3, to the rear row circuit via the communication interface 37. In this case, the microcomputer 33 is designed to output the data at a speed of 9600 bps in intervals of 50 ms.

Figure 11:
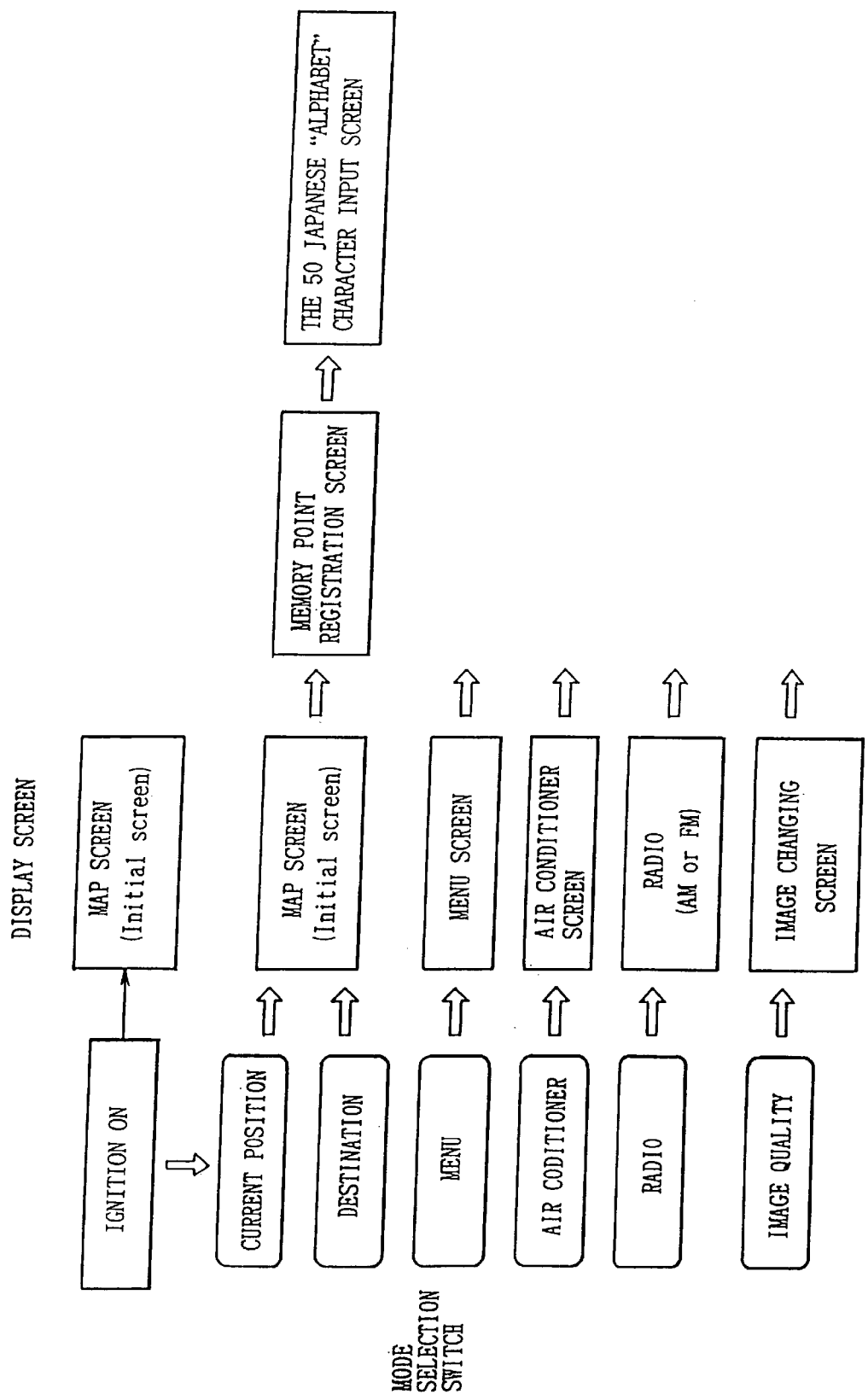
FIG. 11 is a diagram which shows a display order of the display screen corresponding to the operation of touch tracer.
Figure 12:
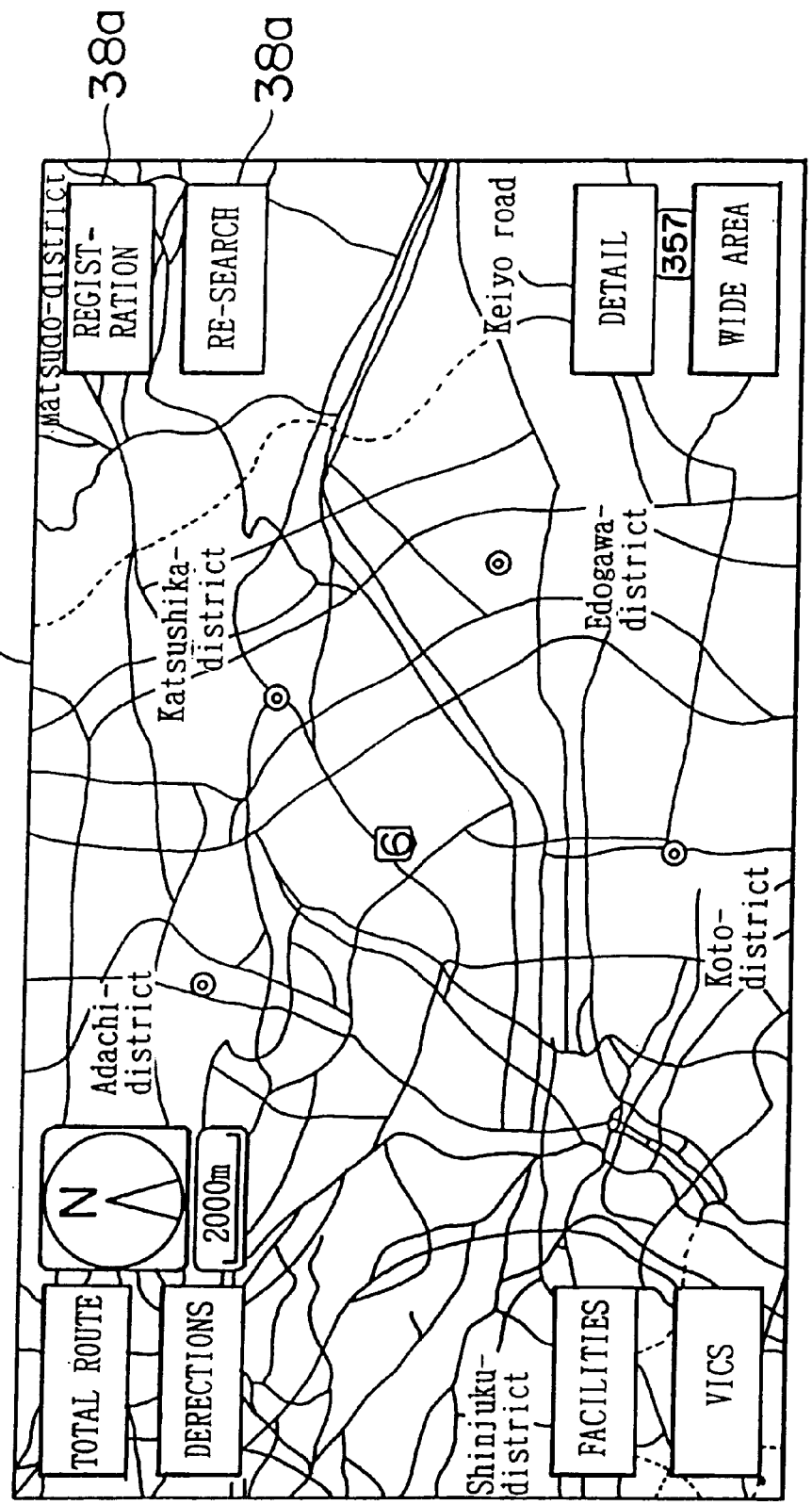
FIG. 12 is a diagram which shows a map screen which is displayed on a display apparatus.

Next, the touch operation functions with respect to the input pad 3, are explained based on the operation of the microcomputer 33. As shown in FIG. 11, the navigation function is operated as the initial function when the power is turned on by the ignition switch. On the display device 2, the map screen 38 which shows the current geographical position, which is shown as one example of an initial screen in FIG. 12, is displayed. At this time, button display parts 38*a* for navigation function selection are displayed at 8 points on the edge of the map screen. These button display parts 38*a* correspond to 8 of protruding bracket 4*b* positions among the brackets 4 that exist on both sides of the input pad 3. Thus, blind operation of the button display part 38*a* is possible by using the protruding brackets 4*b*.

Moreover, by press-operating any of the mode selection buttons 6–11 that are arranged around the input pad 3, as shown in FIG. 11, the selected mode is changed from the map screen display mode to the screen corresponding to the selected mode and displayed on the display device 2. In this case, no matter what mode screen is displayed, another mode screen can be directly displayed by pressing another mode selection switch.

Figure 13:
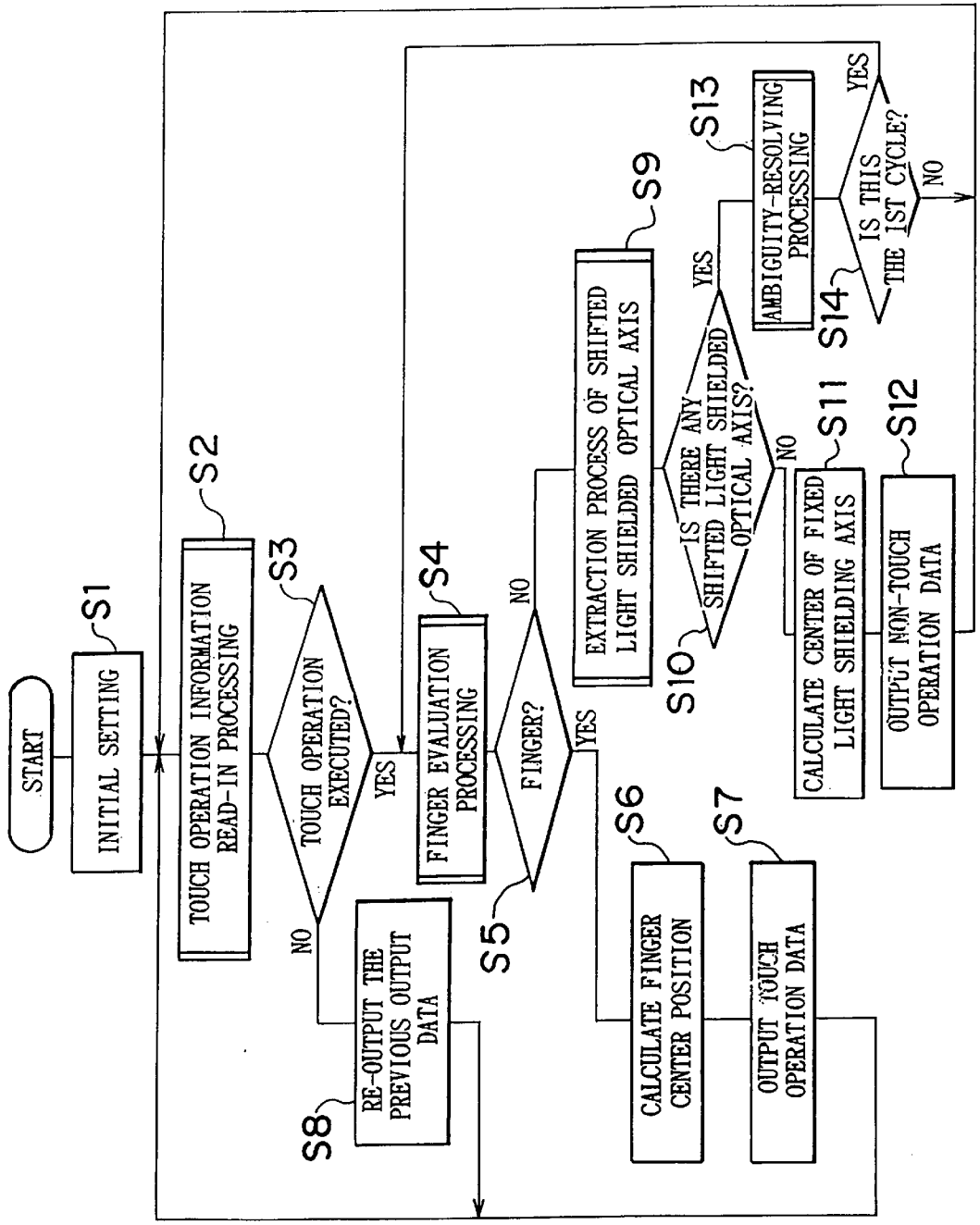
FIG. 13 is a flowchart of a main routine of the microcomputer.

FIG. 13 is a flowchart showing the main operation of the microcomputer 33. The microcomputer 33 performs the touch operation information read-in processing (S2) after an initial setting is performed (S1) when the vehicle power is turned on.

Figure 14:
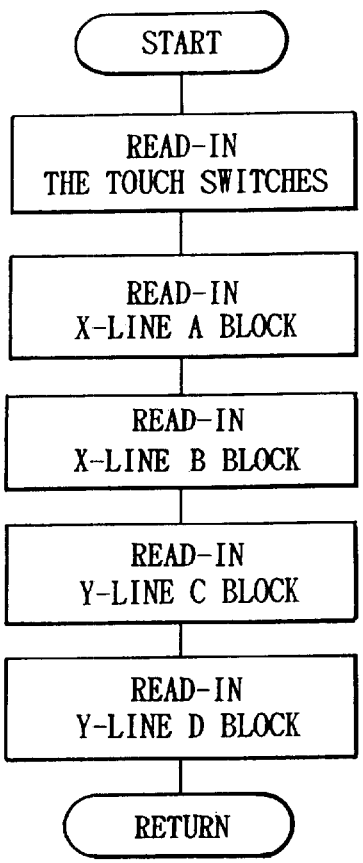
FIG. 14 is a flowchart which shows a touch operation information read-in processing of the microcomputer.
Figure 15:
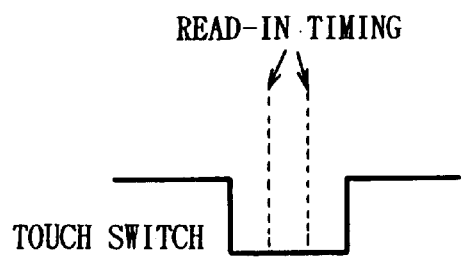
FIG. 15 is a timing chart which shows read-in timing of a touch switch.

FIG. 14 shows the touch operation read-in processing routine. In FIG. 14, the microcomputer 33 first reads the "on" and "off" states of the touch switch 14. Specifically, as shown in FIG. 15, the "on" and "off" states of the touch switch 14 are read twice in 1 ms and are confirmed by logical AND function (logical sum). Next, when the LEDs 19 of the A blocks in the X line are turned on, the "on" and "off" states of the phototransistors 20 of the A block are simultaneously read.

Figure 16:
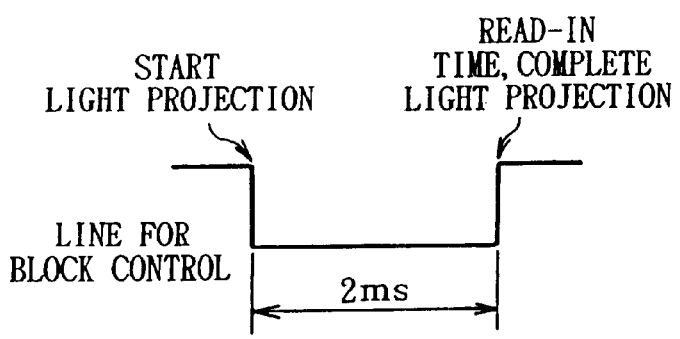
FIG. 16 is a timing chart which shows control timing with respect to a line for block control.

In the reading operation of the phototransistors 20 as shown in FIG. 16, by changing the A block control line 28 from a high level to a low level, the LED 19 which form the A blocks are turned on, and the "on" and "off" states of the phototransistors 20 of the A block are simultaneously read after 2 ms elapse in the "on" state, and the A block control line 28 is simultaneously changed to a high level.

Thus, in the same manner as above, by changing the B block control line 29, the C block control line 30, and the D block control line 31 in order from a high level to a low level in order, the "on" and "off" states of the phototransistors 20 of the B block, C block, and D block are read in that order.

By one cycle of the control operation for each block described above, it is possible to read the "on" and "off" state of all the phototransistors 20 which form the X and Y lines. That is, it is possible to correlate the light-shaded state of the X line to 15 bits and simultaneously to correlate the light-shaded state of the Y line to 11 bits.

In this case, one pair of adjacent optical axes which belong to the same block in each block of the X lines and Y lines are arranged in the opposite direction to the optical axis direction extending from the LEDs 19 to the phototransistors 20, so it is possible to avoid optical interference between the adjacent optical axes.

Furthermore, because the X and Y lines are arranged in different blocks and do not simultaneously operate, for example, the light which was reflected by a finger after being projected by the LEDs 19 which form the X lines cannot be received by the phototransistors 20 which form the Y lines.

Due to the convenience of applying the calculation processing which will be described later, a weighting is given to each optical axis which forms the X and Y lines, respectively, as follows:

X#, Y#=−1
XA, YA=1
XC, YC=3
:
:
XQ, YQ=17
XS, Y$=19
XU=21
XW=23
XY=25
X$=27

In this case, the minimum value of the weighting in the X and Y lines is set at −1 to make the minimum calculation value of the coordinate data showing the center position of the finger that performed the touch operation, closer to 1.

Returning to FIG. 13, after the microcomputer 33 performs the touch operation information read-in process as described above, it determines whether a touch operation has been performed (S3). If the touch operation has not been performed, the previous output data is output again (S8). Furthermore, between the time between immediately after turning the power on and the touch operation, the initial data showing that the touch operation has not been performed, is output. Therefore, the display device 2 determines that the touch tracer 1 has not been touch operated and continues the display of the map screen.

Incidentally, because the touch operation of the touch tracer 1 is ordinarily performed by press-operating the input pad 3, when the display device 2 indicates that touch operation information from the touch tracer 1 is simultaneously pressed, the display device 2 determines that this is due to an abnormal operation and prevents the error display by ignoring the input coordinate data.

Moreover, as shown in FIG. 12, when the operator attempts to operate a desired navigation function on the button display portions 38*a* of the map screen 38, the input pad 3 of the touch tracer 1 is touched by a finger which causes shading of the optical axis. However, in order that display device 2 may determine that the operation was performed by a touch operation (S3; YES), the finger determination process must be performed (S4).

Figure 17:
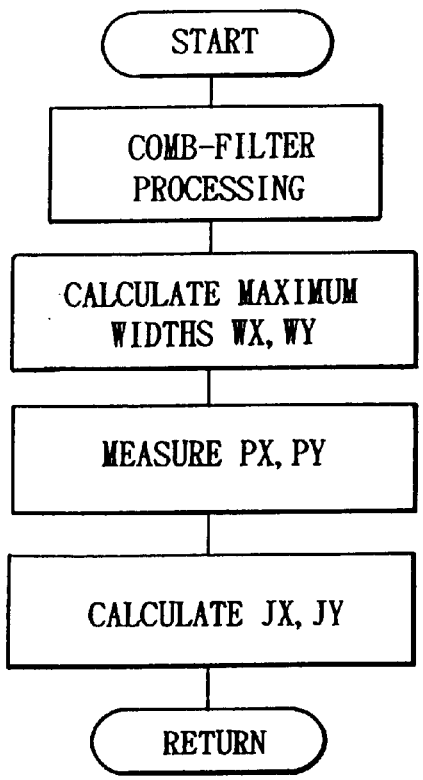
FIG. 17 is a flowchart which shows the finger determination process of the microcomputer.

FIG. 17 shows the finger determination processing routine. In FIG. 17, the microcomputer 33 first performs a comb-tooth filter process. The comb-tooth filter process prevents the effects of incidental light inside the car. That is, when sunlight incident to the inside of the car is irradiated to the touch tracer 1, it is from one direction so that, for example, the light is incident to the phototransistors 20, which are disposed on one side and form the X lines. As a result, despite the fact that the optical axis is shaded by a finger in the X line and that the phototransistors 20 on one side are in a non-light-receiving state, the incidental sunlight may cause the phototransistors 20 to be in a light-receiving state. Therefore, the display device 2 may not accurately detect fingers.

In this case, the phototransistors 20 which form the optical axes on other sides in the X line, enter a non light-receiving state without being affected by sunlight because optical shading axis exists in every other position in the X line, on either side of each light-entering axis.

Thus, if the microcomputer 33 determines that this effect is due to the effects of sunlight when a shaded optical axis exists every other position in the X and Y lines, the light axes which intermittently are inserted between the shaded optical axes, are considered to be shaded optical axes. By so doing, it is possible to prevent the effects of the light and detect the actual shading of an optical axis by a finger.

Next, the maximum widths WX and WY between the shaded optical axes in the X and Y lines, respectively, is calculated. In this case, the maximum width WX is regulated by the width of the first shaded optical axis Xmin and the last shaded optical axis Xmax, the maximum width WY is regulated by the first shaded optical axis Ymin and the last shaded optical axis Ymax. WX and WY can be obtained by the following calculating formulas:

$$WX=(Xmax-Xmin)/2+1$$

$$WY=(Ymax-Ymin)/2+1$$

Xmax, Xmin, Ymax, and Ymin are the numerical values shown by the above-mentioned weightings (X line is–1–27, Y line is–1–19).

Next, the numbers PX and PY of shaded optical axes in the X and Y lines are obtained. PX and PY of shaded optical axes match the number of shaded optical axes which are included in the above-mentioned maximum widths WX and WY and can be obtained by determining the number of phototransistors 20 which form the X line that are off and the number of phototransistors 20 which form the Y line that are off.

Next, the numbers JX and JY of light-entering optical axes in the X and Y lines are obtained. The numbers of light-entering optical axes are numbers of the light-entering optical axes which are included in the above-mentioned maximum widths WX and WY and can be obtained by the following calculation formulas.

$$JX=WX-PX$$

$$JY=WY-PY$$

Furthermore, the microcomputer 33 performs the finger determination process based upon the above-mentioned calculation result. In this case, when both X and Y lines satisfy the following conditions, the touch operation is determined to be performed by finger.

①  The maximum widths WX and WY are within the set area. That is, within the shaded area corresponding to the size of the finger which touches the input pad 3.

②  The numbers JX and JY of light-entering optical axes are the set value or less. That is, the effects of disturbance light or electrical noises is small.

In this case, the conditions to determine ① can be shown as follows.

$$WX\ min \leq WX \leq WX\ max$$

$$WY\ min \leq WY \leq WY\ max$$

The initial setting value is set at WX min=3 (it is possible to change the value to between 2–5), WX max=8 (it is possible to change the value to between within 5–10), WY min=3 (it is possible to change the value to between 2–5), and WY max =8 (it is possible to change the value to between 5–10).

Furthermore, the conditions to determine ② can be shown as follows.

$$JX \leq 3 \text{ (it is possible to change the value to between 2–4)}$$

$$JY \leq 3 \text{ (it is possible to change the value to between 2–4)}$$

As a result of the calculations described above, when it is determined that a finger touches the input pad 3, the center position (Xa, Ya) of the finger can be obtained by the following calculation formulas.

$$Xa=(Xmin+Xmax)/2$$

$$Ya=(Ymin+Ymax)/2$$

Xmin is the minimum value of the maximum width WX, Xmax is the maximum value of the maximum width WX, Ymin is the minimum value of the maximum width WY, and Ymax is the maximum value of the maximum width WY.

The center position of the maximum widths WX and WY can be obtained by the above calculations. In this case, the weighting of each optical axis which forms the X and Y lines is such that odd numbers increase by two, so if the number of shaded optical axes is an odd number, the optical axis position which is located in the center of the maximum widths WX and WY is the center position of the finger. Furthermore, if the number of shaded optical axes is an even number, the center position between the two optical axes which are located in the center of the maximum widths WX and WY is the center position of the finger. At this time, the even number between the odd numbers given to the two optical axes which are located on both sides of an imaginary shaded optical axis can be given as the weighting of the imaginary shaded optical axis by assigning the open shaded optical axis between two optical axes.

When the operator operates a desired navigation function by a touch operation of the button display portion 38a displayed on the map screen 38, the operator touches the center part of the input pad 3 in order to scroll the map, and the microcomputer 33, as described above, determines a finger has touched the input pad 3 and outputs the coordinate data of the touch position. By so doing, the display device 2 displays the touch position to the input pad 3 so that the operator can confirm the current touch position.

Moreover, when the operator touches the portion corresponding to a button display portion 38a on the input pad of the touch tracer 1, the coordinate data showing the position of the button display portion 38 is indicated by changing the color of the touched portion. Therefore, the operator can confirm that the desired button was touched. Then, the microcomputer 33 outputs the touch operation information showing that a touch switch 14 is turned on and the display device 2 displays the button display portion 38a corresponding to the touch switch 14 as if it were concave. In addition, the button display portion 38a simultaneously changes color, and further drives a buzzer for a short period of time. By so doing, the operator can confirm that the desired button display portion 38a has been operated.

The touch tracer 1, as described above, is disposed inside of a car, so depending upon the incidental direction of sunlight to the inside of the car, the sunlight may be incident to the phototransistors 20 and a finger touch may not be accurately recognized. Thus, by using the comb-tooth filter processing as shown in FIG. 17, the following structural strategy prevents the effects of the sunlight.

That is, in front of the phototransistors 20, along the top surface of the input pad 3, the shading film 24 is disposed so as to divide the apertures 27 into two in order to prevent the phototransistors 20 from being fooled by incidental light by absorbing the top-half of the incident light from an upper diagonal direction. Moreover, the lower half of the light which was incident to the apertures 27 reflects upon the inside-bottom surface, but because the concave part 23 is disposed along the optical axis in the inside bottom surface of the aperture 27, the light incident to the bottom surface of the aperture 27 is eventually absorbed by the shading film 24 by being randomly reflected inside the concave part 23.

However, by this method or structural design as described above, it is possible to prevent the effects of sunlight as much as possible, but if an object or obstruction is placed on the input pad 3, fingers cannot be accurately recognized. Thus, with the help of this method, finger touch operations can be accurately recognized.

That is, when finger touch operations are not recognized in step S5 of FIG. 13 (NO), the extraction processing of a shaded optical axis which was shifted (S9) is performed.

Figure 18:
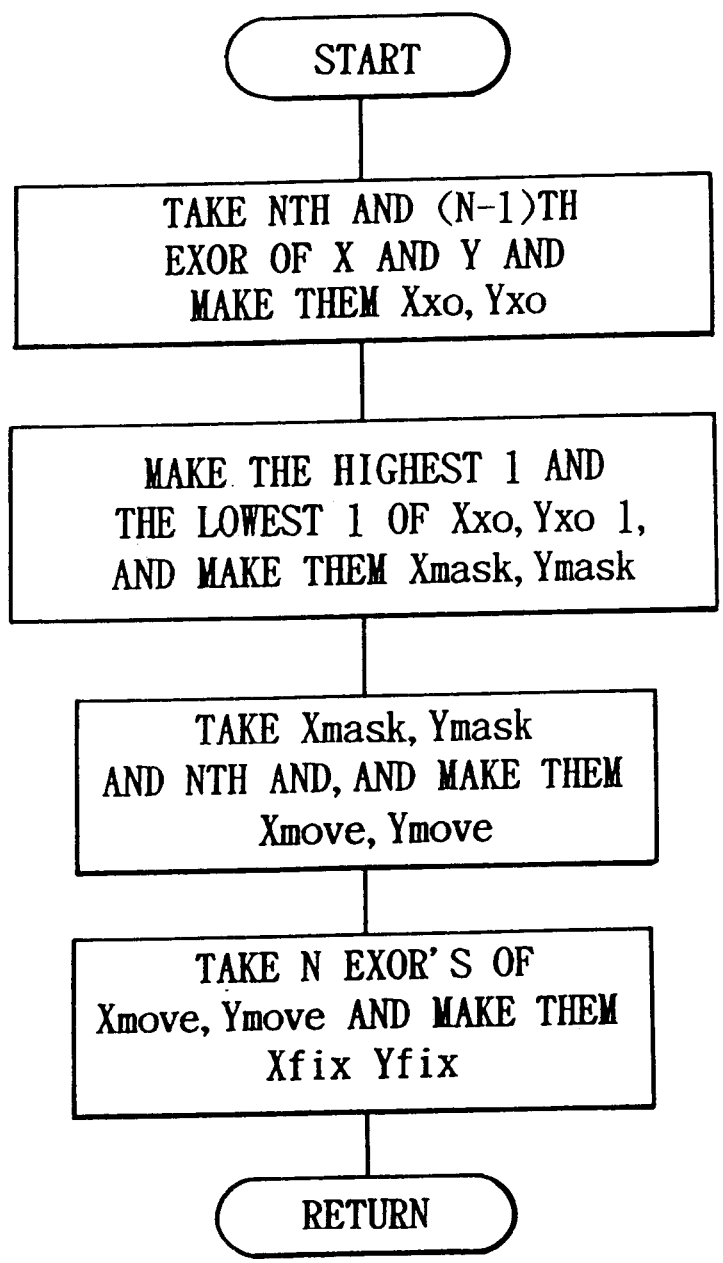
FIG. 18 is a flowchart which shows extraction processing of a light-shielding optical axis that is shifted.

FIG. 18 shows the extraction processing routine of the shaded optical axis which was shifted. In this FIG. 18, the microcomputer 33 performs an EXOR operation (exclusive-OR) of the nth input bit pattern Xn and Yn in the X and Y lines, and the (n−1)th input bit patterns Xn−1 and Yn−1. The logical result is considered to be the changing bit extraction pattern X10 and Y10.

Specifically, as shown in FIG. 19(a), the (n−1)th input bit pattern Xn−1 of the X line is defined as "110001111100000". In this case, each bit of the input bit pattern shows the shaded light state of the optical axis from the 1st time to the 15th time. The input bit pattern 0 shows the light-entering optical axis, and the input bit pattern 1 shows the shaded optical axis. Furthermore, a 1 which is shown by 2 bits (the first optical axis and the second optical axis) from the most significant bit, shows a shaded optical axis by, for example, dust on the input pad. In an input bit pattern, such as the maximum width WX which was obtained in the finger determination processing is 11, the input bit pattern will not be determined as a finger touch operation.

Incidentally, until the operator confirms the touch position on the input pad 3, the operator has to keep moving his finger, so that the optical axis shaded by finger ordinarily moves while an optical axis shaded by dust which adheres to the input pad 3 does not move. Therefore, by moving the shaded optical axis by finger, if the nth input bit pattern Xn of the X line becomes "110000011110000" as shown in FIG. 19(a), the changing bit extraction pattern X10 of the X line becomes "000001100010000". In this case, a 1 shown by the changing bit extraction pattern XIO indicates a changed bit (an optical axis which became light-entering after being light-shaded, or an optical axis that became light-shaded after being light-entering). In the above manner, the changing bit extraction pattern Y10 of the Y line is obtained.

Next, by defining all the bits between the 1 which are located in the most significant position in XXO and XYO and the 1 which is located in the least significant position as 1, the mask bit patterns Xmask and Ymask are defined. The mask bit patterns Xmask and Ymask show all of the optical axes located in the area in which the finger shifted as 1.

Next, taking the logical AND (logical sum) of the mask bit patterns Xmask and Ymask and input bit patterns Xn and Yn, the shifted shaded bit patterns Xmask and Ymask are defined. The shifted shaded bit patterns Xmove and Ymove show the optical axis which shifted in the shaded optical axes shown by the nth input bit pattern Xn (i.e., the optical axis shaded by a finger).

Furthermore, by taking the logical EXOR between the shifting shading bit patterns Xmove and Ymove and the nth input bit pattern Xn, fixed shading bit patterns Xfit and Yfit are defined. The fixed shading bit patterns Xfit and Yfit show the bits which did not change from 1 at the nth input bit pattern (i.e., the shaded optical axes which were shaded by dust).

In FIG. 13, the microcomputer 33 the performs a ambiguity-resolving process (S13) when a shaded optical axis exists which shifts in at least one direction of the X and Y lines (S10: YES). As shown in FIG. 20, in this ambiguity-resolving process, in the X and Y lines, when the shifting shaded optical axis exists, the Xmove and Ymove are set as new X and Y lines. When the shifting shaded optical axis does not exist, Xn and Yn are set as X and Y lines. That is, by invalidating the fixed bit from the input bit pattern, the optical axis shaded by a finger is obtained and based upon the shaded optical axis, the microcomputer 33 again determines again whether a finger touch operation exists. This ambiguity-resolving process is performed only once so that the waste of repeated the operations (S14) can be prevented.

Meanwhile, if the existence of a finger touch operation cannot be detected, and the shifting shaded optical axis does or does not exist despite the ambiguity-resolving processing, if a finger touch is not determined (S10: NO), the center position between the fixed shading optical axes by the shading object is obtained (S11) and the coordinate data is output as abnormal coordinate data Xb and Yb along with the "on" and "off" data of the touch switch 14 (S12).

According to the above structure, where the position of the finger which touches the input pad 3 is optically detected, because the effects of a disturbance light are prevented by using this method, it is possible to compare the optical sensor with the structure of the merely aligned arrangements, and by avoiding the effects by sunlight, it is possible to accurately detect the touch operation of the input pad 3 and output the coordinate data of the touch operation. Furthermore, with the help of this method in detecting only fingers which touch the input pad 3, the touch operation for the input pad 3 is accurately detected.

The invention is not limited to the above-mentioned embodiment, but it can be modified and expanded. It is also acceptable to layer-build the shading film 24 in a state where plural spaces exist. It is also acceptable to output the data from the touch tracer 1, for example, by infrared radiation, to the display device 2. It is also acceptable to removably install the touch tracer 1, and so that it may be placed in a position where the operator desires.

As clarified from the above explanation, according to the touch operation information output device of the present invention, the effects of disturbance light or the existence of an abnormal obstruction are prevented by the design of the structure and the method so that in the structure where the touch operation information is output by optically detecting the touch operation on the operation surface, regardless of the effects of the existence of the disturbance light or the abnormal obstruction. Thus, the invention enables the accurate detection of a touch operation.

What is claimed is:

1. A touch operation information output device comprising:
 a plurality of light projection elements and a plurality of light-receiving elements arranged to form a vertical direction optical axis group and a horizontal direction optical axis group, the vertical direction optical axis group and the horizontal direction optical axis group being composed of a plurality of parallel optical axes in a vertical direction and a horizontal direction on an operating surface, wherein the touch operation information output device outputs the information based on objects contacting the operating surface;

a light-shielding member that shields light from a front surface of the light-receiving elements, the light-shielding member having apertures that form optical axes only between light projection elements that are opposed to the light-receiving elements; and a non-reflective light-shielding slit member provided along the operating surface in the aperture of the light-shielding member, wherein the non-reflective light-shielding slit member substantially partitions an inside of the aperture into at least an upper and lower portion that are substantially parallel to the optical axes.

2. The touch operation information output device of claim 1, wherein the touch operation information output device determines whether an object is contacting the operating surface based on a light-shaded condition of each optical axis.

3. The touch operation information output device of claim 1, wherein a concave part is formed along the optical axis in an inside bottom surface of the aperture of the light-shielding member.

4. The touch operation information output device of claim 1, further comprising:

output means for outputting information based on a sensing of an object contacting the operating surface.

5. The touch operation information output device of claim 4, wherein the output means outputs touch information when it is determined, based on a light shaded condition of each optical axis, that an object has contacted the operating surface.

6. The touch operation information output device of claim 1, wherein a portion of the operating surface changes color upon when the portion is contacted.

7. The touch operation information output device of claim 1, wherein when optical axis is determined to be alternately in a light-shielded and a non-light-shielded condition, the touch operation information output device considers the optical axis as being in a light-shielded condition.

8. A touch operation information output device, comprising:

a plurality of light projection elements and a plurality of light-receiving elements that form a vertical direction optical axis group and a horizontal direction optical axis group that are composed of a plurality of parallel optical axes in a vertical direction and a horizontal direction on an operating surface;

non-reflective light-shielding means for shielding light entering from an upper or lower portion of the light-receiving elements, wherein the non-reflective light-shielding means is substantially parallel to the optical axes; and output means for outputting information based on a sensing of an object contacting the operating surface when it is determined, based on a light shielded condition of each optical axis, that a contact of the operating surface has occurred, wherein the light projection elements and light-receiving elements that form the optical axis groups are alternatively arranged so that an optical axis direction from one of the light projection elements to one of the light-receiving elements is different than the adjacent optical axis.

9. The touch operation information output device of claim 8, wherein when intermittent light-shielding optical axis group exists in which an optical axis is alternately in the light-receiving and non-light-receiving conditions in the optical axis group, the optical axis in the intermittent light-shielded optical axis group is considered as a light-shielded optical axis.

10. A touch operation information output device, comprising:

a plurality of light projection elements and a plurality of light-receiving elements that form a vertical direction optical axis group and a horizontal direction optical axis group that are composed of a plurality of parallel optical axes in a vertical direction and a horizontal direction on an operating surface;

non-reflective light-shielding means for shielding light entering from an upper or lower portion of the light-receiving elements, wherein the non-reflective light-shielding means is substantially parallel to the optical axes; and output means for outputting information based on a sensing of an object contacting the operating surface when it is determined, based on a light-shielded condition of each optical axis, that a contact of the operating surface has occurred, wherein when a plurality of light-shielded optical axes exist in the optical group and continue to be light-shielded and the number of these light-shielded optical axes is a predetermined number, the touch operation information output device determines whether a contact of the operating surface has been performed.

11. The touch operation information output device of claim 10, wherein when these light-shielded optical axis shift, the number of the optical axes that are included in a maximum width from a first light-shielded optical axis to a last light-shielded optical axis is a predetermined number, and when a number of light-entering optical axes that are included in the maximum width is a predetermined number, the touch operation information output device determines that a contact of the operating surface has been performed.

12. The touch operation information output device of claim 11, wherein the output means determines that the contact has not been performed when a plurality of light-shielded optical axes exist in the optical axis group, the light-shielded optical axis that has not been shifted is removed from determination and the determination of the contact is re-executed.

* * * * *